United States Patent
Seo et al.

(10) Patent No.: US 7,110,043 B2
(45) Date of Patent: Sep. 19, 2006

(54) APPARATUS FOR TRANSMITTING/RECEIVING VIDEO SIGNAL

(75) Inventors: Young-joo Seo, Suwon-si (KR); In-sik Park, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 458 days.

(21) Appl. No.: 10/124,245

(22) Filed: Apr. 18, 2002

(65) Prior Publication Data

US 2003/0093512 A1 May 15, 2003

(30) Foreign Application Priority Data

Nov. 13, 2001 (KR) ................. 2001-70377

(51) Int. Cl.
*H04N 3/27* (2006.01)
(52) U.S. Cl. .................................. 348/554
(58) Field of Classification Search ........ 348/552–555, 348/445, 723, 725, 584
See application file for complete search history.

(56) References Cited

U.S. PATENT DOCUMENTS

| | | | | |
|---|---|---|---|---|
| 5,912,710 | A * | 6/1999 | Fujimoto | 348/445 |
| 6,411,302 | B1 * | 6/2002 | Chiraz | 345/545 |
| 6,429,903 | B1 * | 8/2002 | Young | 348/552 |
| 6,438,694 | B1 * | 8/2002 | Saito | 713/189 |
| 6,618,781 | B1 * | 9/2003 | Liauw et al. | 710/301 |
| 6,633,547 | B1 * | 10/2003 | Akatsu et al. | 370/255 |
| 6,661,464 | B1 * | 12/2003 | Kokkosoulis et al. | 348/448 |
| 6,765,624 | B1 * | 7/2004 | Voltz | 348/663 |
| 6,788,352 | B1 * | 9/2004 | Kim | 348/553 |
| 2002/0024616 | A1 * | 2/2002 | Kim | 348/714 |
| 2002/0026647 | A1 * | 2/2002 | Yim et al. | 725/152 |
| 2002/0150248 | A1 * | 10/2002 | Kovacevic | 380/210 |
| 2002/0196843 | A1 * | 12/2002 | Ben-Bassat et al. | 375/219 |
| 2003/0061623 | A1 * | 3/2003 | Denney et al. | 725/125 |

FOREIGN PATENT DOCUMENTS

KR    2000-00064830    11/2000

OTHER PUBLICATIONS

Korean Patent Office Action dated Dec. 11, 2003.

* cited by examiner

*Primary Examiner*—Paulos M. Natneal
(74) *Attorney, Agent, or Firm*—Sughrue Mion, PLLC

(57) ABSTRACT

An apparatus for transmitting a video signal to a remotely installed display apparatus, and a corresponding apparatus for receiving a video signal are provided. The apparatus for transmitting a video signal includes a PCI bridge, a transmitter, and a transceiver-PCI interface. The PCI bridge receives a high-definition (HD) TS or a standard definition (SD) TS, and converts the received HD TS or SD TS to a PCI bus format. The transmitter transmits the HD TS or SD TS, which was converted to the PCI bus format, as a radio signal. The transceiver-PCI interface performs an interface between the transmitter and the PCI bridge. The apparatus for transmitting/receiving a video signal is capable of transmitting/receiving video and audio signals without a wire, thereby allowing easy and convenient installation and management of display devices.

12 Claims, 2 Drawing Sheets

APPARATUS FOR TRANSMITTING/RECEIVING VIDEO SIGNAL

BACKGROUND OF THE INVENTION

1. Field of the Invention

The present invention relates to an apparatus for transmitting/receiving a video signal, and more particularly, to an apparatus for transmitting a video signal to a remotely installed display apparatus, and a corresponding apparatus for receiving a video signal. The present application is based on Korean Application No. 2001-70377, filed Nov. 13, 2001, which is incorporated herein by reference.

2. Description of the Related Art

Until now, cathode ray tubes (CRTs) have been commonly used as display devices, but the use of plasma display panels (PDPs) and liquid crystal displays (LCDs) is spreading rapidly. Therefore, it is apparent that PDPs and LCDs will take the place of CRTs in the near future.

However, display devices such as PDPs and LCDs do not perform functions of receiving or demodulating a video signal, and thus require an additional set top box (STB). A video signal is transmitted from the STB to a PDP or LCD via a wire. In general, since a PDP or an LCD is hung on the wall, many wires are required to transmit video signals from the STB thereto. These wires are unattractive to look at, and further, a signal may not be completely transmitted via the wire when the wire is long, thereby deteriorating the quality of an image reproduced.

SUMMARY OF THE INVENTION

To solve the above problems, it is an object of the present invention to provide an apparatus for transmitting/receiving a video signal using a wireless transmitter/receiver.

To achieve an aspect of the object, there is provided an apparatus for transmitting a video signal, including a peripheral communication interface (PCI) bridge for receiving a high-definition (HD) transmit stream (TS) or a standard-definition (SD) TS, and for converting the same in the format of a PCI bus; a transmitter for transmitting an HD TS or an SD TS, which was converted in the format of PCI bus, as a radio signal; and a PCI transceiver interface for interfacing the PCI bridge and the transmitter.

To achieve another aspect of the object, there is provided an apparatus for receiving a video signal, including: a receiver for receiving an HD TS or an SD TS that is transmitted as a radio signal and converted in the format of a PCI bus; a PCI bridge for converting the HD or SD-grade video signal, which is received from the receiver and converted in the format of PCI bus, into an HD TS or an SD TS; a transceiver-PCI interface for interfacing the receiver and the PCI bridge; and an MPEG-2 decoder for recovering video and audio signals from the HD TS or SD TS output from the PCI bridge, and for outputting the recovered video and audio signals.

To accomplish still another aspect of the above object, there is provided a system for transmitting/receiving a video signal including an apparatus for transmitting a video signal, and an apparatus for receiving a video signal. The apparatus for transmitting a video signal includes a PCI bridge installed in a set top box (STB), the PCI bridge for receiving an HD TS or an SD TS, and for converting the received HD TS or SD TS into the format of PCI bus; a transmitter for transmitting the HD TS or SD TS, which is converted into the PCI bus format, as a radio signal; and a transceiver-PCI interface for interfacing the transmitter and the PCI bridge. Also, the apparatus for receiving a video signal includes a receiver installed in a video signal display, the receiver for receiving an HD TS or an SD TS, which is converted into the format of PCI bus; a PCI bridge for converting an HD or SD-grade video signal, which is received from the receiver and converted into the format of PCI bus, into the HD TS or SD TS; a transceiver-PCI interface for interfacing the receiver and the PCI bridge; and an MPEG-2 decoder for recovering video and audio signals from the HD TS or SD TS output from the PCI bridge, and for outputting the recovered video and audio signals.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
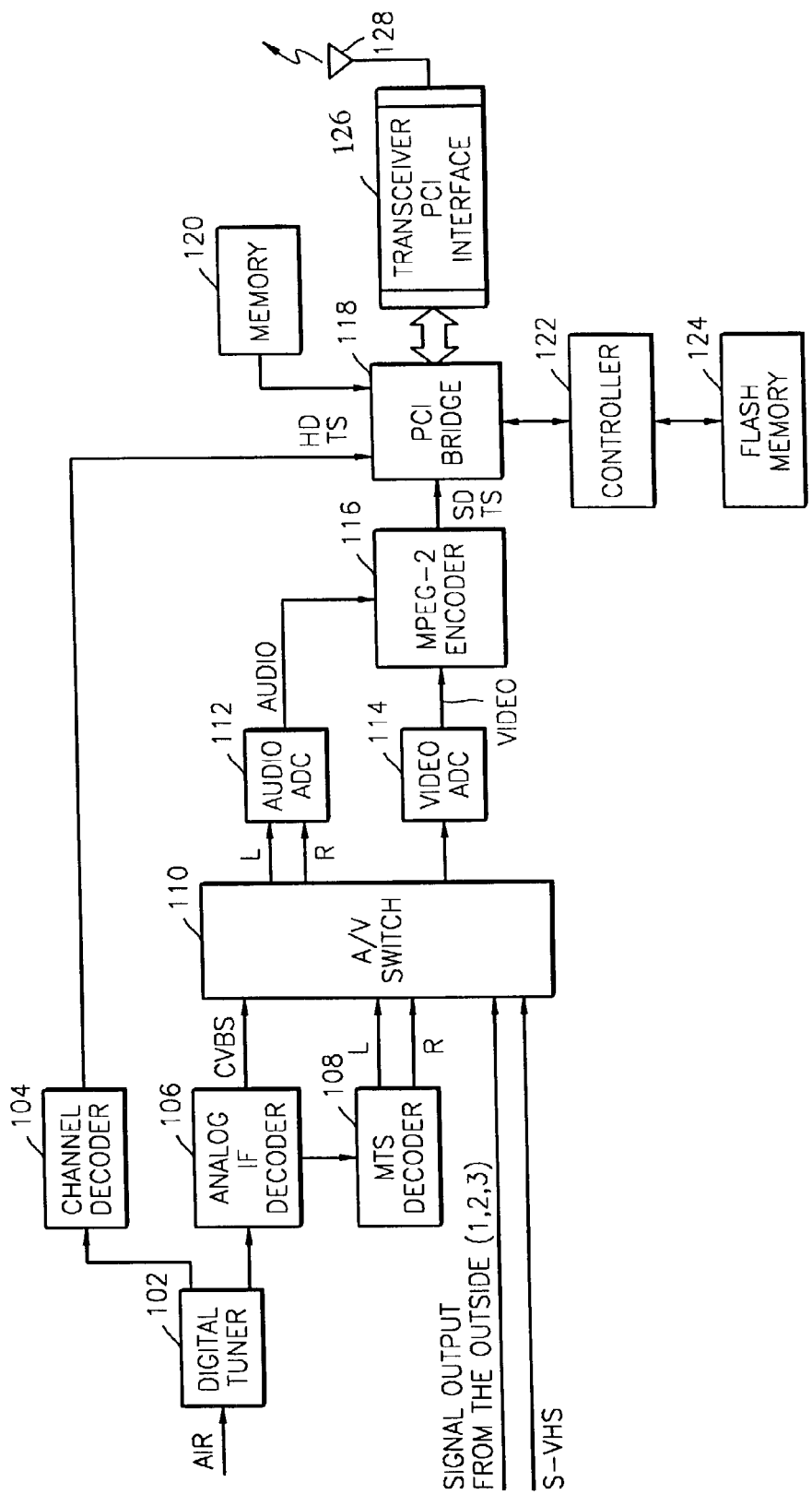
FIG. 1 is a block diagram of the structure of an apparatus for transmitting a video signal according to the present invention.

FIG. 1 is a block diagram of the structure of an apparatus for transmitting a video signal according to the present invention. The apparatus of FIG. 1 includes a digital tuner 102, a channel decoder 104, an analog intermediate frequency (IF) decoder 106, a multi-channel television sound (MTS) decoder 108, an A/V switch 110, an audio analog-to-digital converter (ADC) 112, a video ADC 114, an MPEG-2 encoder 116, a peripheral communication interface (PCI) bridge 118, a memory 120, a controller 122, a flash memory 124, a transceiver PCI interface 126, and a transmitter 128.

In the operations of these components, first, an HDTV signal (HD grade) or a signal output from the outside (e.g., an SD-grade VCR signal or an S-VHS signal) is input to the apparatus of FIG. 1. Then, one of these signals is encoded into MPEG2 MP@ML, i.e., main profile @ main layer; and one of MPEG2 encoding grade, and then is converted into the format of a transmit stream (TS). Next, the TS is converted into the format of a PCI bus and then is transmitted. Here, the TS is composed of packets of 188 bytes, and the packets contain one of video/audio/auxiliary data.

The digital tuner 102 selects a broadcasting signal of a channel from broadcasting signals, and outputs the selected signal. Here, the broadcasting signal may be an HDTV signal or a general TV signal. The HDTV signal output from the digital tuner 102 is transmitted to the channel decoder 104, whereas the general TV signal is converted into an IF signal by the digital tuner 102, and then is transmitted to the analog IF decoder 106.

Then, the analog IF decoder 106 demodulates the IF signal into a composite video broadcasting signal (CVBS), and outputs the same. Further, the analog IF decoder 106 outputs an MTS signal. The MTS signal is demodulated by the MTS decoder 108.

The A/V switch 110 is used by a user to select and output one of CVBS output from the analog IF decoder 106, the audio signal output from the MTS decoder 108, signals 1, 2, 3 output from the outside, and a signal S-VHS output from the outside.

Audio and video signals output from the A/V switch 110 are converted into digital signals by the audio ADC 112 and the video ADC 114, respectively, and then are sent to the MPEG-2 encoder 116.

A signal applied to the MPEG-2 encoder 116 is an SD-grade general TV signal or an S-VHS signal. The MPEG-2 encoder 116 encodes the SD-grade video signal into MPEG2 MP@ML, and then coverts the encoded MPEG2 MP@ML into the format of the TS, and outputs the same.

To the PCI bridge 118 are applied the HD TS output from the channel decoder 104, and the SD TS output from MPEG-2 encoder 116. Then, the PCI bridge 118 converts the HD TS or the SD TS into the format of a PCI bus, and outputs the same. For this conversion, the memory 120, the controller 122, and the flash memory 124 are used.

The output from PCI bridge 118 is transmitted to the transmitter 128 via the transceiver PCI interface 126. Then, the transmitter 128 transmits an HD-grade or an SD-grade video signal that was converted into the PCI bus format.

The apparatus of FIG. 1 is designed to be coupled to an STB. Thus, although the PDP or the LCD hangs on the wall, it receives a signal from the STB using the apparatus illustrated in FIG. 2, rather than a wire. Therefore, a wire is not required.

Figure 2:
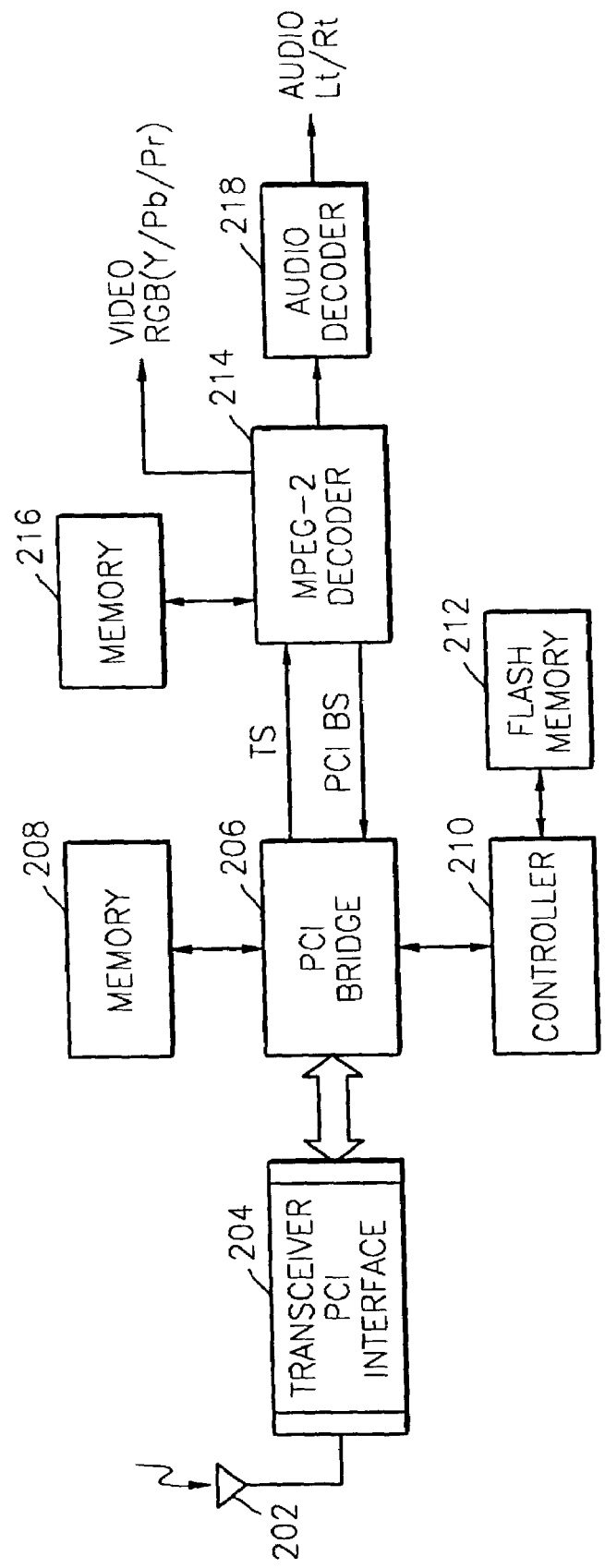
FIG. 2 is a block diagram of the structure of an apparatus for receiving a video signal according to the present invention.

FIG. 2 is a block diagram of the structure of an apparatus for receiving a video signal according to the present invention. The apparatus of FIG. 2 includes a receiver 202, a transceiver PCI interface 204, a PCI bridge 206, a memory 208, a controller 210, a flash memory 212, an MPEG-2 decoder 214, a memory 216, and an audio decoder 218.

The apparatus of FIG. 2 receives an HD TS or an SD TS, which was converted into the PCI format, from the apparatus of FIG. 1, demodulates the HD TS or the SD TS into an audio or video signal, and outputs the same.

In detail, the receiver 202 receives the HD or SD-grade video signal that was converted into the PCI bus format and transmitted from the transmitter 128 of the transmitter. The received HD-grade or SD-grade video signal is sent to the PCI bridge 206 via the transceiver PCI interface 204. Next, the PCI bridge 206 converts the PCI bus format signal, which was converted from an HD TS or SD TS format, into an HD TS or SD TS format again. For this operation of the PCI bridge 206, the memory 208, the controller 210, and the flash memory 212 are used.

The HD TS or SD TS output from the PCI bridge 206 is transmitted to the MPEG-2 decoder 214. Then, the MPEG-2 decoder 214 demodulates the transmitted HD TS or SD TS into MPEG2 MG@ML, and outputs the same as video and audio signals. The video and audio signals output from the MPEG-2 decoder 214 are transmitted to the PDP or the LCD.

The apparatus of FIG. 2 is designed to be coupled to a PDP, LCD or the like. Thus, the apparatus of FIG. 2 can take the place of a wire used for transmitting a signal from an STB when attaching a PDP or an LCD to the wall.

While this invention has been particularly shown and described with reference to a preferred embodiment thereof, it will be understood by those skilled in the art that various changes in form and details may be made therein without departing from the spirit and scope of the invention as defined by the appended claims, As described above, an apparatus for transmitting/receiving a video signal, according to the present invention, is capable of transmitting/receiving video and audio signals without a wire, thereby allowing easy and convenient installation and management of display devices.

Further, according to the present invention, conventional wire lines are not used in transmitting or receiving a video signal, and thus, a signal can be completely transmitted or received, thereby maintaining the quality of a reproduced image.

What is claimed is:

1. An apparatus for transmitting a video signal, comprising:
    a PCI bridge for receiving a high-definition (HD) transmit stream (TS) or a standard-definition (SD) TS, and converting the received HD TS or SD TS to a format of a peripheral communication interface (PCI) bus;
    a transmitter for transmitting the HD TS or the SD TS, which was converted to the format of a PCI bus, as a PCI formatted radio signal; and
    a PCI transceiver interface for interfacing the PCI bridge and the transmitter.

2. The apparatus of claim 1 further comprising a MPEG-2 encoder for receiving an SD-grade video signal and encoding the SD grade video signal in accordance with an MPEG standard, and outputting the encoded signal as an SD TS.

3. The apparatus of claim 2, wherein the MPEG-2 encoder is an MP@ML encoder.

4. The apparatus of claim 2 further comprising an A/V switch for receiving a plurality of composite video signals, and for selectively transmitting one of the composite video signals to the MPEG-2 encoder.

5. The apparatus of claim 4 further comprising:
    a tuner for receiving broadcasting signals, selecting a general TV signal from the broadcasting signals, and outputting the general TV signal as an intermediate frequency signal; and
    an analog IF decoder for recovering a broadcast composite video signal from the intermediate video signal output from the tuner, and supplying the broadcast composite video signal as one of the plurality of composite video signals to the A/V switch.

6. The apparatus of claim 5, wherein the tuner is adapted to select an HDTV signal from the broadcasting signals, and to output the HDTV signal, and
    the apparatus further comprises a channel decoder for demodulating the HD TS from the HDTV signal, and supplying the demodulated HD TS to the PCI bridge.

7. A system for transmitting/receiving a video signal including an apparatus for transmitting a video signal, and an apparatus for receiving a video signal, wherein the apparatus for transmitting a video signal comprises:
    a first PCI bridge installed in a set top box (STB), the PCI bridge for receiving an HD TS or an SD TS, and for converting the received HD TS or SD TS to the PCI bus format;
    a transmitter for transmitting the HD TS or the SD TS, which was converted to the PCI bus format, as a radio signal; and
    a transceiver-PCI interface for interfacing the transmitter and the first PCI bridge, and
    wherein the apparatus for receiving a video signal comprises:
    a receiver installed in a video signal display, the receiver for receiving the HD TS or the SD TS, which is converted to the PCI bus format;
    a second PCI bridge for converting an HD or an SD-grade video signal, which is received from the receiver and converted to the PCI bus format, into the HD TS or the SD TS;
    a transceiver-PCI interface for interfacing the receiver and the second PCI bridge; and an MPEG-2 decoder for recovering video and audio signals from the HD TS or SD TS output from the second PCI bridge, and for outputting the recovered video and audio signals.

8. The system of claim 7, wherein the apparatus for transmitting a video signal further comprises an MPEG-2 encoder for receiving an SD-grade video signal, encoding this signal in accordance with the MPEG-2 standard, and outputting the encoded signal as the SD TS.

9. The system of claim 8, wherein the MPEG-2 encoder is an MP@ML encoder.

10. The system of claim 8, wherein the apparatus for transmitting a video signal further comprises an A/V switch for receiving a plurality of composite video signals, and for selectively supplying one of the composite video signals to the MPEG-2 encoder.

11. The system of claim 10, wherein the apparatus for transmitting a video signal further comprises:

a tuner for receiving broadcasting signals, selecting a general TV signal from the broadcasting signals, and outputting the general TV signal as an intermediate frequency signal; and an analog IF decoder for recovering a broadcast composite video signal from the intermediate frequency signal output from the tuner, and for outputting the recovered broadcast composite video signal, as one of the plurality of composite video signals, to the A/V switch.

12. The system of claim 11, wherein the tuner is adapted to select an HDTV signal from the broadcasting signals, and output the HDTV signal, and the apparatus for transmitting a video signal further comprises a channel decoder for demodulating the HD TS from the HDTV signal, and for outputting the demodulated HD TS to the first PCI bridge.

* * * * *